3,363,259
CHART RECORDERS
Leonard H. Taylor, Loudwater, England, and John Collins, Upper Hutt, Wellington, New Zealand, assignors to Perkin-Elmer Limited, Beaconsfield, Buckinghamshire, England, a British company
Filed Aug. 30, 1965, Ser. No. 483,568
Claims priority, application Great Britain, Sept. 4, 1964, 36,327/64
7 Claims. (Cl. 346—68)

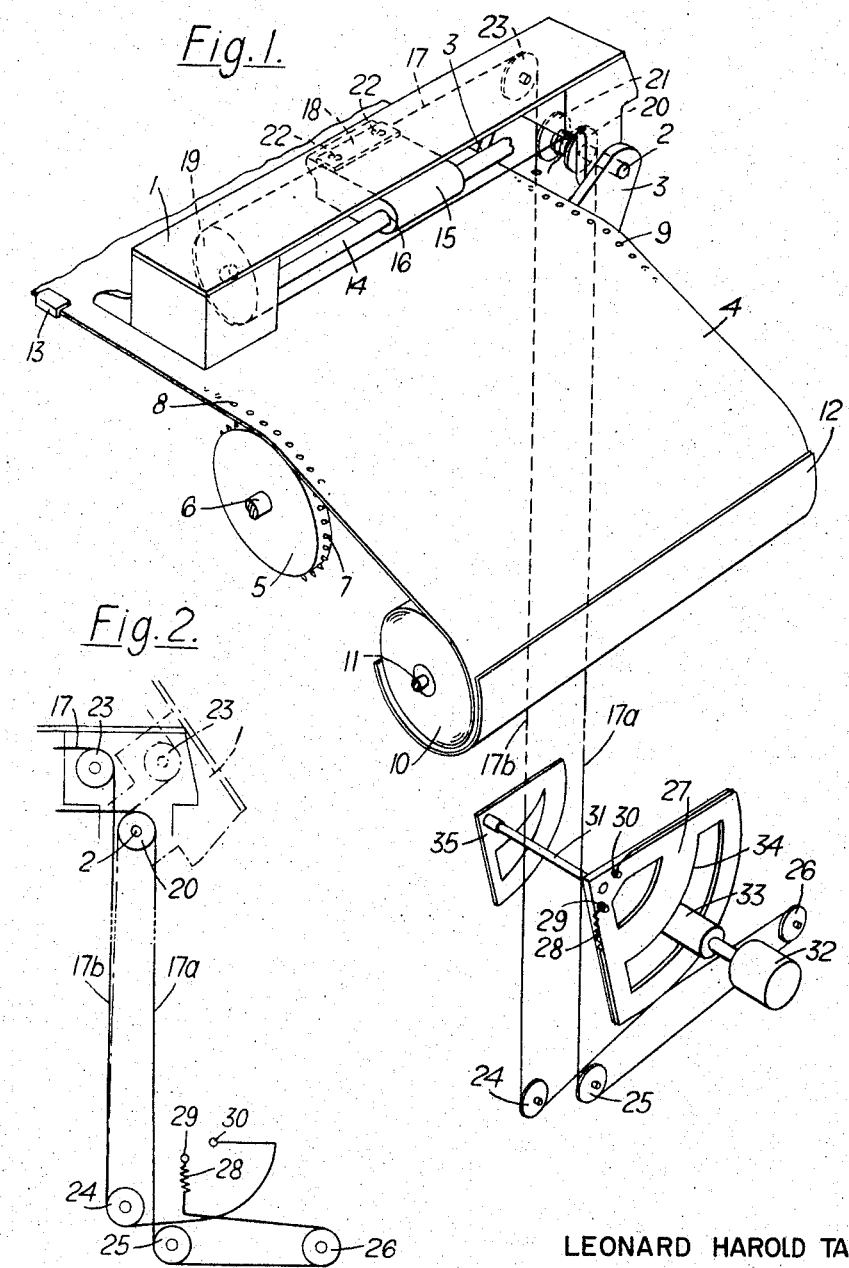

ABSTRACT OF THE DISCLOSURE

A chart recorder (of the type in which a cable drive system moves a stylus carriage along an arm over the chart) has the arm pivoted at one end so as to facilitate replacement of the chart. The cable would therefore slacken when the arm is raised. The pulleys guiding the cable in the vicinity of the pivot axis are so arranged and an additional compensating pulley (which engages the cable only in the raised position of the arm) is provided to take up the part of the cable which tends to slacken.

---

This invention relates to chart recorders and is particularly concerned with the mechanism for driving the recording stylus across the chart surface in accordance with variations of the physical quantity which has to be recorded. It is, of course, important that the movements of the stylus should correspond accurately to the variations of the physical quantity and moreover that replacement of the chart material in the recorder should not be obstructed by the stylus and driving mechanism.

According to the present invention the recording stylus of a recorder is moved along an arm transversely to the direction of relative movement of the chart and the arm by a light substantially inextensible cable driven in accordance with variations in the quantity to be recorded while in the arm itself is pivoted adjacent one side of the chart so that the arm can be raised for chart replacement purposes, the path of the cable being around a first guide pulley adjacent the pivotal axis of the arm, around a guide member mounted adjacent the end of the arm and around a second guide pulley adjacent the pivotal axis, the arrangement of the pulleys in relation to the pivotal axis being such as to permit the arm to be raised without substantial change in the length of the cable path. When the arm is raised the chart is completely unobstructed and may be then easily inspected or replaced while when the arm is lowered, the stylus is immediately in position for further recording without the need for any adjustment. The cable is preferably constituted by a very light chain which gives great flexibility and allows small diameter pulleys to be used. It also reduces frictional and hysteresis effects and enables high accuracy and high speed recording to be obtained.

To ensure that the path length of the cable is maintained substantially constant when the arm is raised about its pivotal axis, the first pulley around which the cable passes before passing along the arm may be mounted on the pivotal axis. The second pulley may then be mounted above the pivotal axis while a compensating guide member is arranged substantially coaxially with the pivotal axis so that when the arm is raised, the cable passes over the second pulley and around the compensating member in an "S" shaped path. Consequently, as the arm is raised, the cable unwinds from the first pulley and, by virtue of the S shaped path, winds up by a corresponding amount on the compensating member thereby keeping the total path length constant. As this occurs, the recording stylus will be moved relatively to the arm due to the winding and unwinding but when the arm is lowered the reverse action will take place and the stylus will therefore come back to its original position.

To avoid errors it is important that the cable should be maintained under tension at all times, and for this purpose one free end of the cable should preferably be attached to a driving member by means of a spring which maintains the necessary tension. For example, the driving member may be in the form of a sector of a circle which is turned about its own axis in accordance with variations in the quantity to be recorded. The free ends of the cable are led in opposite directions around the curved circumference of the sector, one being anchored directly to it and the other by way of a tension spring. In this way rotary movements of the sector are translated into corresponding linear movements of the cable and hence of the stylus, and the possibility of any slack in the cable is avoided.

By way of example one form of construction in accordance with the invention as applied to a spectrophotometer, will now be described with reference to the accompanying drawings in which:

FIGURE 1 is a perspective view of part of a chart recorder as applied to a spectrophotometer; and FIGURE 2 is a schematic view of the arrangement of pulleys and part of the cable path.

Referring first to FIGURE 1 the recorder stylus (not shown) can move along an arm 1 traversely to the direction of movement of the chart 4. The arm 1 is pivoted about a spindle 2 journalled in a pair of brackets 3 which are attached to the recorder chassis (not shown). The spindle 2 constitutes a pivotal axis for the arm 1 which can be thereby swung upwards together with the recorder stylus to enable access to be gained to the chart 4.

A driving sprocket 5 for the chart 4 is mounted on a shaft 6 which is journalled in the recorder chassis. The sprocket 5 is formed with teeth 7 which engage with corresponding sprocket holes 8 in the edge of the chart. A similar sprocket is also mounted on the shaft 6 and engages with sprocket holes 9 in the opposite edge of the chart. A rigid member (not shown) is disposed beneath the arm 1 so as to provide a spine which prevents the chart material buckling or otherwise distorting when passing beneath the stylus. The shaft 6 on which the sprockets are mounted is driven at a contsant rate proportional for instance to time and by means of the positive engagement between the sprocket teeth 7 and sprocket holes 8, and 9 imparts a corresponding movement to the chart 4. The shaft 6 is driven in an anti-clockwise direction as shown and the chart is reeled off a spool 10 mounted on bearings 11. A guide 13 is located at one side of the chart to ensure that it feeds correctly onto the adjacent area which serves as a flat viewing table. A plate 12 is mounted so as to guide the chart from the spool 10 to the sprockets. This same plate 12 also serves to guide the chart so that it rewinds around the spool 12 when the direction of chart movement is reversed.

The arm 1 carries a cylindrical rail 14 which extends the length of the arm. A carriage 15 is supported by the rail, the latter passing through a longitudinal aperture 16 in the carriage. The recording stylus is attached to the underside of the carriage 15. The pivoting arrangement of the arm is such that the latter is prevented from being lowered below the horizontal so that it cannot contact the chart. The carriage 15 however is free to pivot about the rail 14 and hence the recording stylus remains in contact with the chart surface with a constant contact pressure which is dependent on the weight of the carriage even through there may be minor irregularities on the chart surface.

The carriage 15 together with the stylus is moved along the rail 14 by a light inextensible chain 17 which passes between the top of the carriage and a plate 18. The latter is screwed to the carriage by screws 22. The chain 17 can thereby be clamped between the plate and the carriage after being adjusted relatively to the chain.

One run of the chain extends from the carriage 15 along the arm and around a guide member in the form of a pulley 19 rotatably mounted adjacent the end of the arm 1. The chain then extends back along the arm and around a first pulley 20 (FIGURE 2) rotatably mounted on the spindle 2, that is to say on the pivotal axis of the arm 1. The run of the chain from the other side of the carriage 15 extends along the arm and around a second pulley 23 rotatably mounted on the arm above the pivotal axis and in front thereto as, viewed in FIGURE 1. A further compensating guide member in the form of a pulley 21 is rotatably mounted on the spindle 2 and is of the same diameter as the pulley 20. When the arm is in the lowered position as shown in FIGURES 1 and 2, the chain does not contact the pulley 21. However if the arm is raised slightly the chain comes into contact with the pulley 21 and winds around this pulley as the arm is raised to the position shown in chain dotted outline in FIGURE 2, the path of the chain around the pulleys 21 and 23 being S shaped. This arrangement ensures that the pulley 21 does not present any additional frictional effect when the recorder is in use. As the chain winds around the compensating pulley 21 it unwinds from the pulley 20. The arrangement of the pulleys is such that the path length of the chain between the point where it contacts the pulley 20 to the point where it contacts the pulley 21 remains constant thereby preventing the chain being additionally stressed. The winding and unwinding of the chain will cause the carriage 15 to move along the arm but as the opposite winding and unwinding action will occur as the arm is lowered, the carriage will return to its original position. This arrangement allows the arm to be lifted in the middle of a recording, for instance to refill the stylus marking fluid reservoir without effecting the accuracy of the trace.

The run of chain 17a after passing over the pulley 20 extends downwardly and around two further pulleys 25 and 26 rotatably mounted on the recorder chassis. The chain then passes around part of the circumferential surface of a sector-shaped member in the form of a quadrant 27. The chain passes up one straight side of the quadrant where it is connected to a spring 28 anchored to the quadrant at 29.

The run of chain 17b after passing around the pulley 23 also extends downwardly and passes around a pulley 24 rotatably mounted on the recorder chassis and then along part of the circumferential surface of the quadrant 27 in the opposite direction to the run of chain 17a and then along the other straight side to an anchorage point 30. The spring 28 thus keeps the chain 17 in a state of tension. Although the chain path length remains substantially constant when the arm is raised (because of the relationship between the first pulley 20, the second pulley 23 and in particular the compensating pulley 21), spring 28 will also allow any very small changes in the path length that may occur (either because of manufacturing tolerances of the various parts, changes in temperature or other environment factors, or any uncompensated second-order effects of raising the arm 1).

The quadrant 27 is driven about a spindle 31 by means of an electric motor 32 through a friction drive comprising a rubber rimmed wheel 33 in contact with a part 34 of the quadrant. The spindle 31 also carries an optical attenuator 35, forming part of the spectrophotometer, so that the position of the quadrant 27 is an indication of the position of the attenuator 35. The quadrant 27 turns in response to the application of an electrical input to the motor 32 which is proportional to variations of the physical quantity to be recorded. Therefore, so one run of the chain 17a moves in one direction and the other run 17b moves in the opposite direction leading to a corresponding movement of the carriage 15 and recording stylus.

To reduce frictional resistance to a minimum all the pulleys can be made of a plastic sold under the registered trademark "Delrin" and each pulley mounted on its spindle or pivot by a ball bearing. The chain can be made of rolled gold on gilding metal having a nickel plated finish. The pulley grooves may be formed so as to allow alternate links of the chain to lie evenly opposed.

For reasons already described the use of a chain ensures positive and accurate response by the carriage 15 and the stylus carried thereby, and the path followed by this chain permits ready movement of the arm 1 to give direct access to the chart surface beneath. This can be done without in any way disturbing the chart datum or the position of the stylus in relation to the chart. The ease of doing this is particularly important where it may be necessary to change frequently between recording papers with different scales; for instance a spectrophotometer may have papers with different scales for different wave length regions or for different abscissa expansion factors.

The chart recorder which has been described employs an arm which is fixed relatively to the recorder chassis. However the invention is equally applicable to a recorder in which the chart is stationary relatively to the chassis and in which the arm and associated driving mechanism moves transversely to the direction of stylus movement.

We claim:

1. A chart recorder of the type in which a transverse arm is attached to the fixed main frame and a recording stylus carriage is moved along said arm in accordance with variations in the quantity to be recorded, so that a second relative movement in a second different direction between a chart and the transverse arm will cause a graphical recording to be made, comprising:
    means pivotally mounting said transverse arm adjacent its first end to said fixed frame, so that said arm is pivotable from a lowered position closely overlying the chart to a raised position remote from said chart;
    the means for moving said stylus carriage along said transverse arm comprising: a substantially inextensible cable means, a first guide means mounted on said frame at lease adjacent said pivotally mounting means, a second guide means mounted on said transverse arm in the vicinity of the other end remote from said first pivotally mounted end, and a third guide means mounted on said fixed frame in at least the vicinity of said pivotally mounting means;
    said cable means having a continuous portion in consecutive engagement with said first frame-attached guide means, said second arm-attached guide means, and said third frame-attached guide means;
    and compensating means for engaging and displacing a part of said cable means at least adjacent said continuous portion upon pivoting of said transverse arm to its raised position,
    whereby slack in said cable portion which would otherwise be caused by the raising of said transverse arm is compensated.

2. A chart recorder according to claim 1, in which:
    said first guide means is a pulley;
    and said compensating means is a circular member of substantially the same diameter as said first guide pulley, whereby raising of said transverse arm causes unwinding of a first part of said cable means from said first guide pulley and winding of a substantially equal second part of said cable means onto said compensating circular member, so that the total path length of said cable means remains substantially constant.

3. A chart recorder according to claim 1 in which:
said first guide means is a generally circular first member, centered on the pivotal axis of said transverse arm,
and said compensating means is a generally circular second member, having a circular configuration of substantially the same diameter as said first guide member, also centered on said pivotal axis;
whereby rising of said transverse arm causes unwinding of a first part of said cable means portion from said generally circular first guide member and winding of a substantially equal second part of said cable means onto said second compensating member, so that the total path length of said cable means remains substantially constant.

4. A chart recorder according to claim 1, in which:
said compensating means is of such construction and so positioned realtive to the path of the cable means that said cable means is out of contact with said compensating means when said transverse arm is in said lowered position,
whereby additional drag loading of said cable means is avoided during the recording operation.

5. A chart recorder according to claim 1, in which:
a tension spring is attached in series relationship to said cable means, so as to maintain a predetermined degree of tension on the entire cable means,
whereby substantially the same predetermined tension is maintained on said cable both in the lowered and raised position of said transverse arm.

6. A chart recorder according to claim 1, in which:
said means for moving said stylus carriage also comprises a circular sector member,
said cable means is held in contact with the circumference of said circular sector member;
and driving means are operatively connected to drive said circular sector member about its own central axis in accordance with variations in the quantity to be recorded.

7. A chart recorder according to claim 1, in which:
said cable means comprises a light chain.

References Cited

UNITED STATES PATENTS

| | | | |
|---|---|---|---|
| 1,710,555 | 4/1929 | Tascarella | 33—1 |
| 3,065,468 | 11/1962 | Edstrom | 346—139 |

RICHARD B. WILKINSON, *Primary Examiner.*

L. M. LORCH, *Assistant Examiner.*